April 23, 1929.  C. ROSENWALD  1,709,878
HAIR WAVING BAKER
Original Filed Sept. 10, 1926
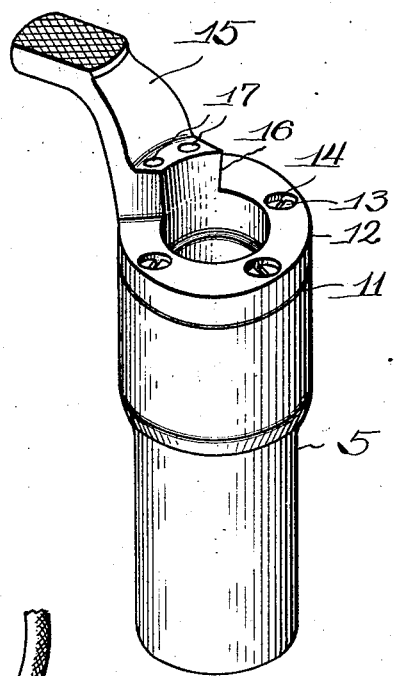
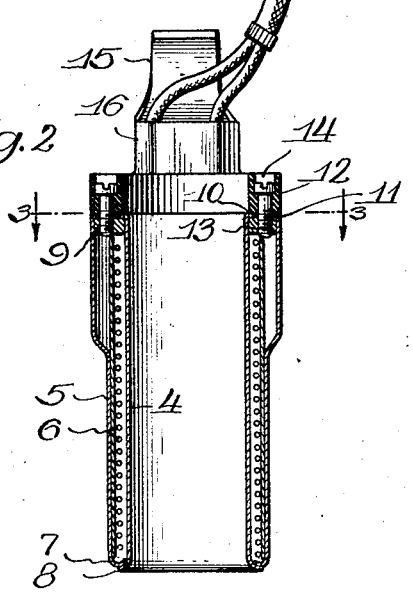
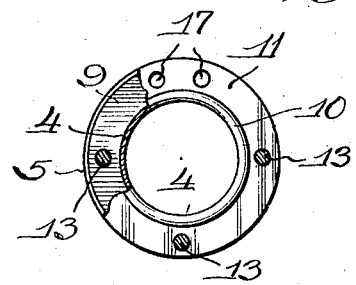

Patented Apr. 23, 1929.

1,709,878

UNITED STATES PATENT OFFICE.

CHARLES ROSENWALD, OF CHICAGO, ILLINOIS, ASSIGNOR TO UNIVERSAL PERMANENT WAVE MACHINE COMPANY, OF CHICAGO, ILLINOIS, A CORPORATION OF ILLINOIS.

HAIR-WAVING BAKER.

Application filed September 10, 1926, Serial No. 134,595. Renewed October 8, 1928.

This invention relates to bakers which are used in applying a permanent wave to human hair and its object is to provide an improved device of novel construction which can be easily handled without liability of burning the operator's hand.

In the accompanying drawing illustrating a selected embodiment of the invention.

Fig. 1 is a perspective view of the baker.
Fig. 2 is a vertical sectional view; and
Fig. 3 is a transverse sectional view on the line 3—3 of Fig. 2.

The baker comprises a hollow body consisting of an inner shell 4 and an outer shell 5 spaced apart and forming heating chamber in which is inclosed an electric heating unit 6 of suitable construction. At one end of the baker the edge 7 of the shell 5 is curved inwardly and the edge 8 of the shell 4 is curved outwardly over the edge 7 to close the heater space at this end. A ring 9 is arranged between the shells at the other end of the baker and the edge 10 of the inner shell is crimped over the ring. A mica washer 11 is arranged on the ring and an annular cap 12 of insulating material, such as bakelite, is secured over the washer to the ring by screw bolts 13, the bolt openings 14 in the cap being counterbored to receive the heads of the bolts. The cap is provided at one side with an outwardly curved handle 15 and a boss 16 at the base of the handle has openings 17, to receive the conductor wires 18 to the heating unit.

In practice the baker is applied to the hair and the electric current is switched on to provide the heat required for the waving operation. By the time this is completed the baker is hot and the handle provides a convenient means by which the baker is removed from the hair. This should be done quickly to prevent damage to the hair and, of course, it must be done carefully to avoid injury to the individual whose hair is being waved, by pulling the hair and irritating the scalp or by burning the scalp. Since the handle is insulated from the heat it can be held firmly in the hand of the operator and easily and quickly removed.

I do not limit the invention to the particular construction herein shown and described, but I reserve the right to make all such changes in the form, construction and arrangement of parts as fall within the scope of the following claim.

I claim:

A hair waving baker comprising an outer shell, an inner shell spaced therefrom and forming a heating chamber therebetween, said outer shell being curved inwardly at the bottom thereof and adapted to interlock with the outwardly covered lower end of the inner shell to close one end of the chamber, a ring arranged between the shells and their upper ends, the upper end of said inner shell being crimped over said ring, a washer arranged over the crimped end of the ring, and an annular cap secured over the washer and to said ring, said cap being made of insulating material and having a handle projecting therefrom.

CHARLES ROSENWALD.